No. 728,197. PATENTED MAY 19, 1903.
F. A. BRIGHAM.
SNOW PLOW.
APPLICATION FILED FEB. 9, 1903.
NO MODEL. 2 SHEETS—SHEET 2.
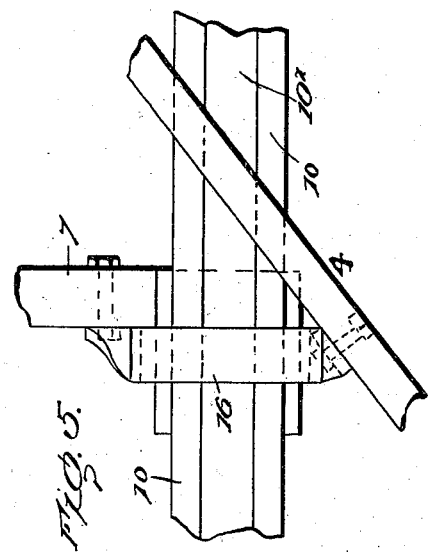
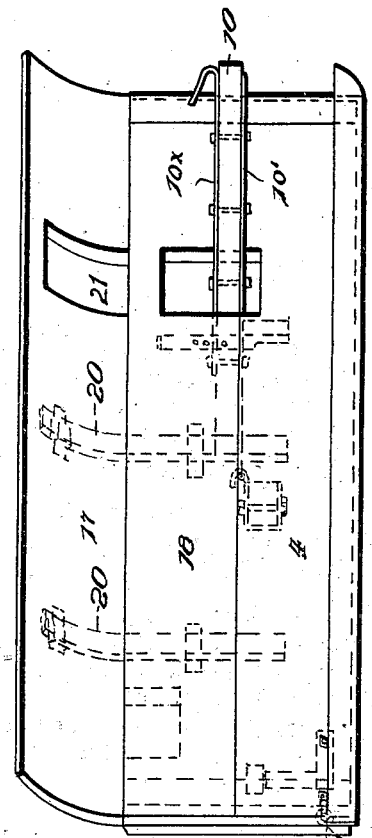
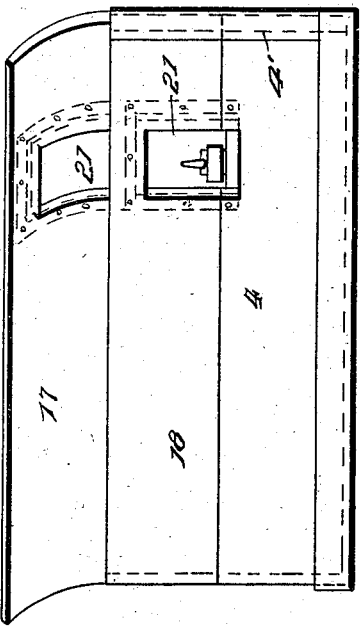
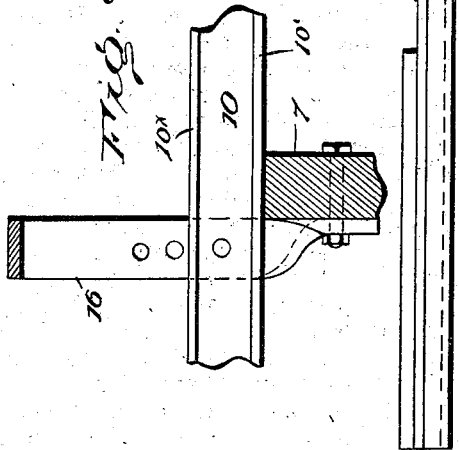
Witnesses
C. M. Catlin
M. B. Bird
Inventor
Frank A. Brigham
By Benj. R. Catlin
Attorney No. 728,197. Patented May 19, 1903.

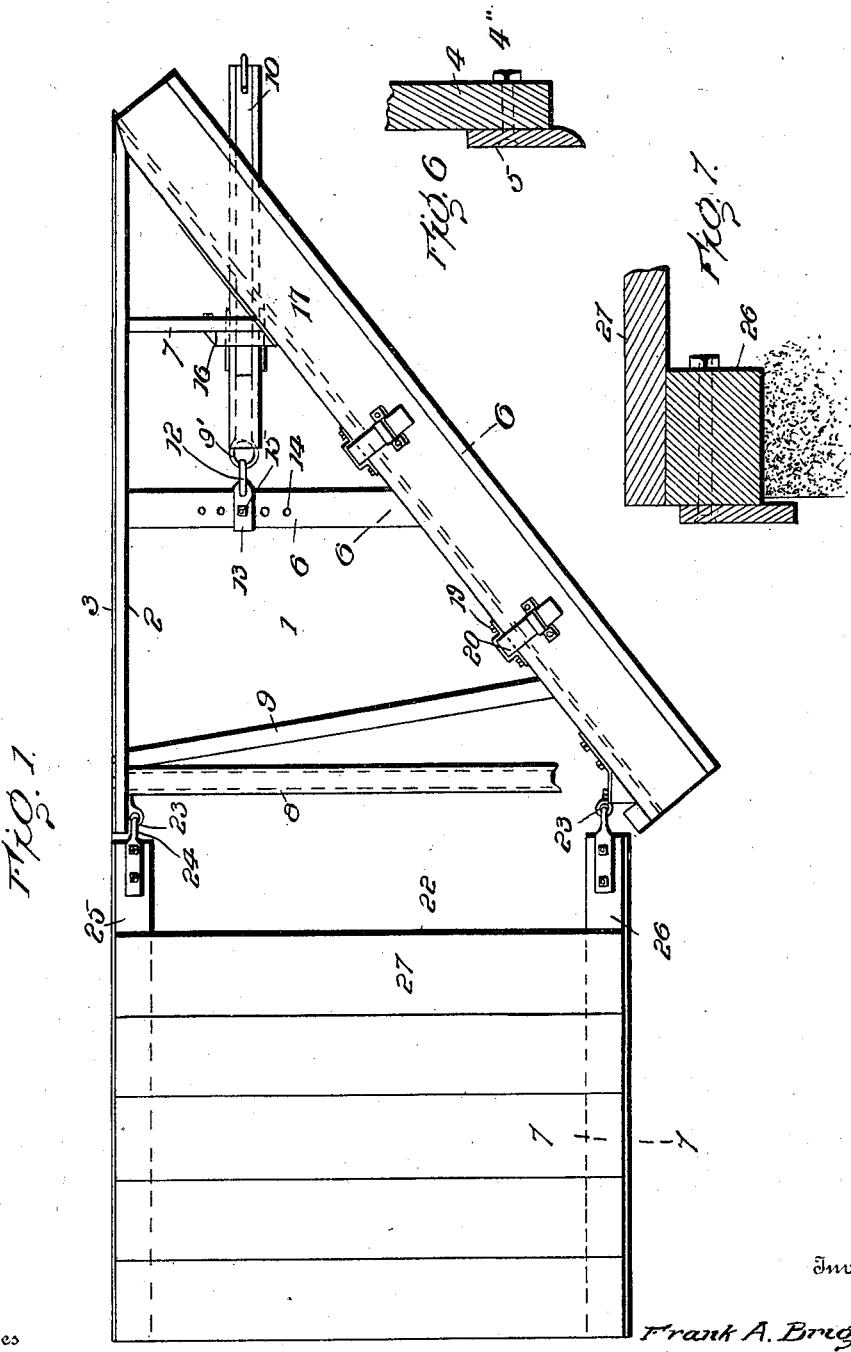

UNITED STATES PATENT OFFICE.

FRANK A. BRIGHAM, OF ROCHESTER, NEW YORK.

SNOW-PLOW.

SPECIFICATION forming part of Letters Patent No. 728,197, dated May 19, 1903.

Application filed February 9, 1903. Serial No. 142,601. (No model.)

*To all whom it may concern:*

Be it known that I, FRANK A. BRIGHAM, a resident of Rochester, in the county of Monroe and State of New York, have invented certain new and useful Improvements in Snow-Plows; and I do hereby declare the following to be a full, clear, and exact description of the invention, such as will enable others skilled in the art to which it pertains to make and use the same.

The invention relates to snow-plows, and has for its objects to adapt such plows for clearing walks, tracks, and the like and to increase their efficiency and certainty of action under all practical circumstances.

The invention consists in the construction hereinafter described and pointed out.

In the accompanying drawings, Figure 1 is a plan. Fig. 2 is a side elevation, partly in section. Fig. 3 is a partial section, on an enlarged scale, of a draw-bar-adjusting device. Fig. 4 is a front view of the oblique member. Fig. 5 is an enlarged partial plan showing the support for the draw-bar; and Fig. 6 is a partial section on line 6 6 of Fig. 1, the view being toward the left and the section limited to the lower member of a snow-pushing device. Fig. 7 is a partial section on line 7 7 of Fig. 1, the view being toward the left.

Numeral 1 denotes a plow having a side member 2, shod on the outer side, as indicated at 3, and having an obliquely-arranged member 4, provided with an ice and snow cutting blade 5. These two members are joined by cross members or beams 6, 7, 8, and 9 and may be otherwise connected and strengthened in any usual or desired manner.

10 denotes the draw-bar or pole, loosely connected to beam 6 by means of an eye 9' on the pole and a hook 12 on a clip 13, adjustably secured to the beam. 14 indicates holes for receiving a securing-bolt 15. The eye 9' is formed on the edge of a strap 10', bolted to the under side of the pole or draw-bar by bolts, which also secure to said bar on its upper side a similar strap 10$^\times$, provided at its forward end with a hook, as indicated in Fig. 2. In the present instance the bar is rectangular in cross-section, and each strap is narrower than the bar; but these details are not essential. The object of this adjustment is to provide for attaching the pole to the plow in the central line of resistance, the normal point of attachment being at one side of the central line of the plow, as shown.

16 indicates a yoke or post secured to beam 7 and provided with holes for the vertical adjustment of the pole to vary the cutting action of the blade 5. Said blade 5 is preferably made concave, with its cutting edge directed forward, as indicated. It is attached to the plow member 4 by bolts, such as indicated at 4", and combined with snow-pushing sections 17 and 18 in any desired number, one or more of these sections being preferably attachable to adapt the plow to different depths of snow.

20 denotes posts or ribs fixed to the plow member and adapted to pass through brackets or loops fixed by bolts 19 to the rear side of sections 17 and 18.

Holes for the draw-bar are denoted by 21.

The plow thus far described is adapted to throw snow to the right. It is guided by the runner or side member 2, which resists lateral crowding, and is drawn in lines parallel thereto by the suitable attachment of the draw-bar, as described. To further insure that the plow may be drawn in lines parallel to runner 2, a follower 22 is loosely connected to the plow-frame, having suitable eyes 23 to engage hooks 24, fixed to the side runners 25 and 26. These runners are preferably shod with steel and extend below the level of the runner 2 and cutter 5. They are connected and covered, as indicated at 27, and being thus covered constitute a sled on which the driver may ride. When the plow is used for clearing walks, the runners 25 and 26 will run at each side thereof, the device having sufficient width, and the follower or sled 22 will resist any occasional or other sidewise movement of the plow. It does not, however, interfere seriously with a turning movement of the plow, and may, if desired, be temporarily folded forward on the plow when in use or may be so folded for storage. It is obvious that for use on walks it is not essential that both runners of the followers shall run at the side of the walk, and only one may so run. In some cases if the walk be wide the plow may clear one side and may be returned to clear the other, throwing the snow, for example, now toward a fence and then toward the street. It is also adapted for clearing the middle or other part of a road or street, but is primarily intended for walks.

The improvement is not limited to particular dimensions nor to particular materials nor to immaterial details of construction. These loops will be made of such size as to receive the posts 20, so that the sections can be placed on or taken off at will, the posts being fixed to the part 4 in any desired manner. Oak wood and steel are very suitable materials and so, also, are the proportions indicated in the main figures of the accompanying drawings.

Having described my invention, what I claim as new, and desire to secure by Letters Patent, is—

1. In a snow-plow, the frame comprising the side runner and the obliquely-arranged cutting-blade, and a snow-pushing section detachably connected to the plow.

2. In a snow-plow, the frame comprising the side runner and the obliquely-arranged cutting-blade, and a follower pivoted to the plow.

3. In a snow-plow, the frame comprising the side runner and the obliquely-arranged cutting-blade, and a follower pivoted to the plow, and having one runner immediately behind the plow side runner.

4. In a snow-plow, the frame comprising the side runner and the obliquely-arranged cutting-blade, and a follower having one runner immediately behind the said side runner of the plow, and having another runner connected to the plow near the rear end of the cutter.

5. In a snow-plow, the frame comprising the side runner and the obliquely-arranged cutting-blade, and a follower pivoted to the plow, said follower being adapted to be folded upon the plow to facilitate turning or storage.

6. In a snow-plow, the frame comprising the side runner and the obliquely-arranged cutting-blade, and a follower pivoted to the plow, said follower having runners extending below the level of the runner and cutting edge of the plow.

In testimony whereof I have signed this specification in the presence of two subscribing witnesses.

FRANK A. BRIGHAM.

Witnesses:
H. H. WIDENER,
JAS. E. SMITH.